INVENTORS
Bernard A. Sobel
Raymond R. Goldberg
BY Albert Sperry.
ATTORNEY

INVENTORS
Bernard A. Sobel
BY Raymond R. Goldberg
Albert Sperry
ATTORNEY

United States Patent Office 2,920,251
Patented Jan. 5, 1960

2,920,251

AMPLIFYING SYSTEM

Bernard A. Sobel, New Brunswick, and Raymond R. Goldberg, Trenton, N.J.

Application February 28, 1955, Serial No. 490,773
11 Claims. (Cl. 317—149)

This invention relates to electronic amplifiers and is directed particularly to circuits which include a multigrid electron tube and may be used for control of relays, switching operations and other current responsive means. This application is a continuation-in-part of application Serial No. 323,868, filed December 3, 1952, and now abandoned.

Common practice regarding such circuits is to utilize a change in grid circuit resistance to operate a relay connected in the plate circuit of the electron tube. With such circuits, the grid current which must flow to insure sufficient change of plate current to cause the relay to operate is of the order of one microampere. Typical commercially available units and published circuits require minimum grid currents of from 0.7 to 5 microamperes. In consequence of this relatively high grid current, the maximum external grid resistance which can be tolerated and still maintain reliable relay operation is of the order of 10 megohms. If the external grid circuit resistance is much above 10 megohms the relays do not operate. For those circuits where it is essential to have grid resistances over that limit, it has heretofore been necessary to utilize multi-stage amplification and sensitive polarized relays. However, such circuits are necessarily complex and delicate and require meticulous and continuous adjustment for reliable operation.

These disadvantages of prior art devices are overcome with the present invention and an amplifier is provided which is capable of operating conventional relays with a single stage of amplification. Moreover, the amplifier of the present invention enables the relay to be effectively operated with grid currents as low as 0.001 microampere. This permits the external resistance in the grid circuit to be of the order of 1000 megohms and still insures reliable relay operation. Thus the usual limitations of external circuit resistance do not apply and the circuit can be utilized in many cases where much more elaborate and complex circuitry have previously been needed. Furthermore, the amplifier of the present invention is much less sensitive to physical shock than the polarized relays heretofore employed and requires no adjustment.

In accordance with the present invention, that element of the tube which would correspond to the screen grid in a tetrode or other multigrid electron tube is utilized as the load delivering element of the tube. That element of the tube which is normally the plate is connected instead to a source of potential maintained decidedly lower than that applied to the screen in a fashion similar to the usage ordinarily accorded the screen of the electron tube.

It has been found, in this type of operation, that, at some value of plate potential which is less than the IR drop through the cathode resistance, under open grid circuit conditions, and slightly higher than the IR drop through the cathode resistance, under closed grid circuit conditions, the grid current will be minimized and the change in screen current, between open and closed grid circuit conditions, will be maximized. Moreover, at any value of plate potential within these limits, the change in screen current will be substantially greater than the corresponding change in plate current. By making use of this phenomenon, much more effective and sensitive operation of current responsive devices can be attained.

Accordingly, it is an object of the present invention to provide an amplifier which is capable of operation with substantially larger grid resistances than have heretofore been possible.

One of the objects of the present invention is to increase the sensitivity of electronic amplifiers.

Another object of the present invention is to reduce the grid current required for effective operation of a multigrid thermionic tube, such as a tetrode or pentode, for example.

A further object of the present invention is to provide a circuit in which the effective power is drawn from what corresponds to the screen grid in a multigrid electronic tube.

Another object of the present invention is to provide a new type of electronic circuit in which the screen is maintained at a potential above that of the plate, said screen also being used as the power output element of the tube, and in which the grid current is markedly reduced from that obtained in conventional operation of the tube.

An additional object of the invention is to provide a circuit including a multigrid electronic tube wherein the screen is maintained at a potential higher than said plate while the plate is maintained at a potential less than the IR drop through the cathode resistance, under open grid circuit conditions, and greater than the IR drop through the cathode resistance, under closed grid circuit conditions, thus causing the grid current to become minimized and the change in screen current, between open and closed grid circuit conditions, to become maximized.

These and other objects and features of the invention will appear from the following description thereof in which reference is made to the figures of the accompanying drawings.

In each of the forms of the invention chosen for purposes of illustration in the accompanying drawings, a screen grid tube is indicated generally at 2 and is provided with a cathode 4, a grid 6, a screen 8 and a plate 10. The construction and arrangement of these elements of vacuum tubes are generally well known and they may vary greatly in construction since the advantages of the present invention apparently are attained with substantially any type of screen grid tube independently of the form, arrangement and spacing of the elements within the evacuated enclosure, although it is, of course, contemplated that the grid and screen will be interposed between the cathode and the plate with the grid adjacent the cathode. Moreover while the figures of the drawings each show a tetrode, it will be obvious that other multigrid tubes may be used wherein the other grids are connected to the cathode in any suitable manner.

Figure 1:
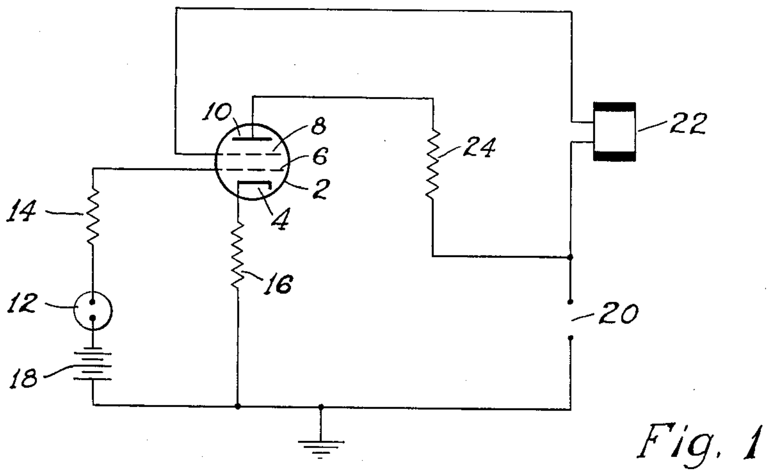
Fig. 1 is a diagrammatic illustration of one typical circuit arrangement embodying the present invention.

The electrical circuit illustrated in Fig. 1 is particularly adapted for use with such equipment as thermoregulators, liquid level controls, and safety controls wherein sparking is to be eliminated and contact corrosion must be reduced to a minimum. In this circuit the control device is indicated at 12 and is connected to the grid 6 through a resistance 14 while cathode bias is supplied across resistance 16. The grid resistance 14 may be inherent in the control device or may be external, as shown in Fig. 1. The current in the grid circuit may be supplied by a source of potential such as battery 18. However, in the uses for which this circuit is primarily intended, the grid current is generally self-induced and is a function of the tube characteristics and the grid and cathode resistance 14 and 16. Moreover, the grid current is substantially independent of the resistance in the grid circuit. Therefore, even vast changes in grid circuit resistance will have only a slight effect on the grid element.

The screen may be maintained at any potential supplied by the power source 20 acting through the inductance and resistance of the relay coil 22 or other indicating or current responsive device. The potential supplied to plate 10 is substantially less than that applied to the screen and must be less than the IR drop through cathode resistor 16 when the grid circuit is open and slightly greater than the IR drop through resistor 16 when the grid circuit is closed. This may be accomplished in any suitable manner, for example, by connecting a suitable resistance 24 between the screen 8 and plate 10 within the circuit. However, similar results may, obviously, be attained where the plate voltage is fixed and the grid current is varied provided that the plate voltage is less than the IR drop through the cathode resistance 16 when the grid current is at its lower limit and higher than the IR drop through the cathode resistance when the grid current is at its upper limit. In general, with tubes such as the 117/L7/M7 the plate voltage should not be more than about 80 volts and optimum conditions will usually be found at plate potentials of approximately 40 to 50 volts. On the other hand, the screen voltage should be at least 50 volts higher than that of the plate and may be as much as 500 volts or more. The specific values will, of course, be different for different types of tubes and different manufacturers. However, the relationships will remain the same.

With this arrangement it has been found that under closed grid circuit conditions, the screen current and grid current will both attain a minimum at the same value of plate voltage. This condition assures maximum current amplification when the output of the tube is taken from the screen. Furthermore, the shape of the curves shows that the condition is very stable and, consequently the screen current is not subject to sudden large variations.

Figure 2:
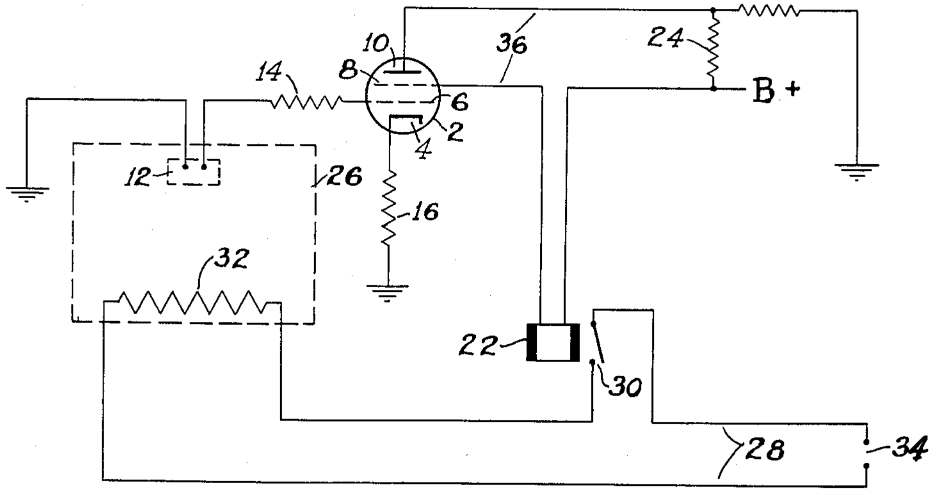
Fig. 2 illustrates an alternative circuit arrangement in which the present invention is employed.

The circuit of Fig. 2 is more detailed than that of Fig. 1 in that control device 12 is represented as a thermoregulator located in a water bath 26 and relay 22 serves to complete a compensating circuit 28 including the contact 30 and a heating or correcting element 32 which is located in the water bath 26 and supplied with current from a source 34.

While the control device is represented as a thermoregulator it may be any type of device responsive to a condition to be controlled or measured and the correcting element may be any form of compensating device such as a motor, pump, valve, light, indicator or supplementary electrical circuit as desired in any particular installation.

In using the circuit of Fig. 2, closing of the contacts of the thermoregulator 12 may, for example, occur when the temperature of the water bath 26 falls below a predetermined minimum. Current is then applied to the grid 6 through the resistance 14 which may have any value up to 1000 megohms or more. The current change in the screen circuit 36 which occurs in response to operation of the thermoregulator then serves to actuate relay 22 to close the compensating circuit 26 through contact 30. The heating element 32 is thereby energized to raise the temperature of the water bath 26 until the thermoregulator is again actuated to break the grid circuit and thereby cause the release of contact 30 to break the compensating circuit 28.

In a typical installation, it has been found that a change in current flow in the grid circuit of only 0.01 microampere will give rise to a change in current flow in the screen circuit 36 and through relay 22 of 10 milliamperes. This represents a current amplification of approximately one million.

No such degree of current amplification could hitherto be obtained without multi-stage operation. The present invention, therefore, gives wholly new uses and applications to tetrodes, pentodes and other multi-element discharge tubes without requiring any changes in the tube construction whatever. In fact, the sensitivity of circuits, such as those in Figs. 1 and 2, is so high that the ionization produced in an ordinary Bunsen burner flame is sufficient to cause operation of the relay 22. Many so-called non-conducting or insulating materials also pass sufficient current to actuate a relay or indicator, and in actual tests, it has been found that a relay may be operated with a grid resistance of the order of 1000 megohms Such substances as gasoline, ether, alcohol and wood have resistivities lower than this. Circuits of this type are therefore ideally suited for use in flame controls, safety devices and for use in calibrating high resistors, although they of course have many other uses and applications.

Figure 3:
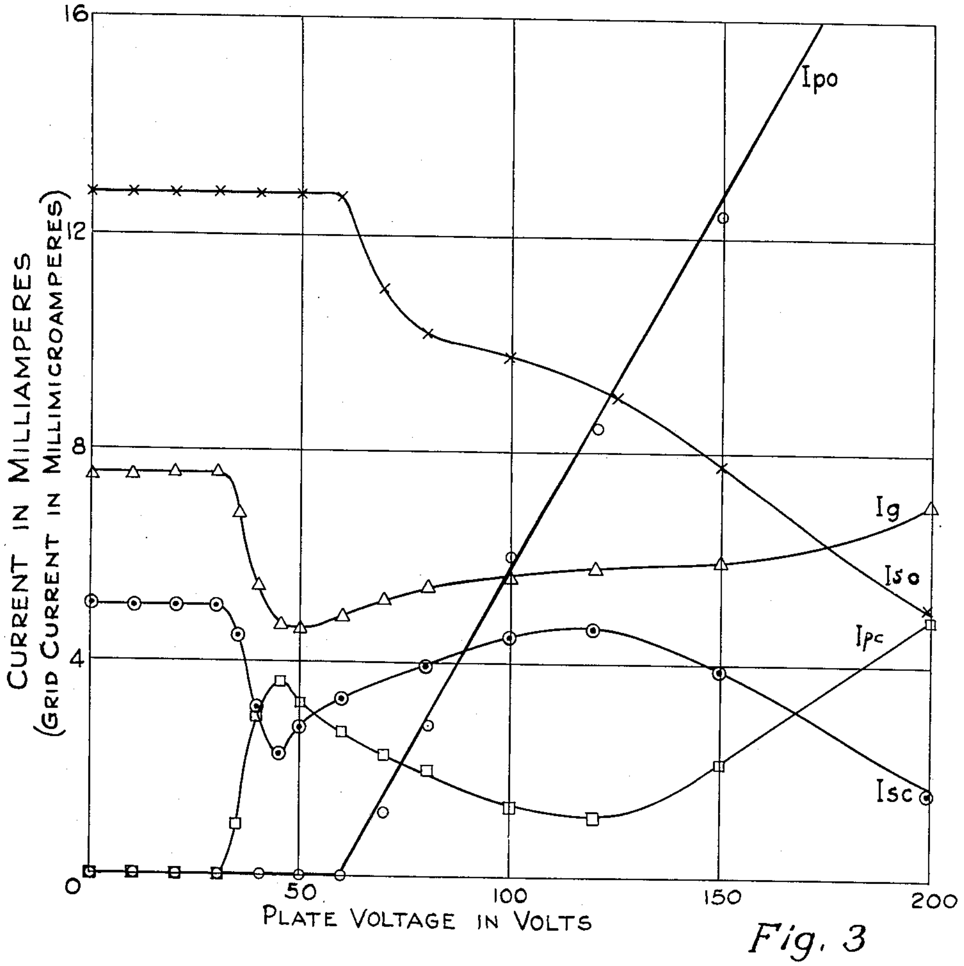
Fig. 3 is a graph illustrating certain characteristics of the circuit of Fig. 1

The characteristics of circuits such as those of Figs. 1 or 2, are represented by the curves shown in Fig. 3 wherein the screen supply voltage was fixed at 300 volts and the screen load resistance, cathode biasing resistance and grid circuit resistance, corresponding to relay 22 and resistances 14 and 16 of Figs. 1 or 2, were fixed, respectively, at 10,000 ohms, 6000 ohms and 5.2 megohms. However, it should be clearly understood that these values are not essential or critical in any way. Variations may be made in the cathode bias and screen load resistances of 2000 to 20,000 ohms and in the grid circuit resistance of up to 1000 megohms or more. Such changes may effect the shape and position of the curves but the basic relationships will be unaltered.

In Fig. 3, the curve for the screen current, under open grid circuit conditions, is identified as $I_{so}$, while the curve for the screen current, under closed grid circuit conditions, is indicated as $I_{sc}$. The plate currents are designated $I_{po}$, for open grid circuit conditions, and $I_{pc}$, for closed grid circuit conditions. The grid current, $I_g$, was multiplied by a factor of 1,000,000,000 in order to bring the readings within the range of the graph of Fig. 3.

It will be seen that, under the conditions cited, with the grid circuit open, the plate does not begin to draw current until the plate voltage is approximately 60 volts, as indicated by curve $I_{po}$. Below this level, all of the current is carried off by the screen, as shown by curve $I_{so}$. On the other hand, with the grid circuit closed, the plate begins to draw current at about 30 volts of plate voltage as shown by the curve $I_{pc}$. Moreover, the plate current, $I_{pc}$, reaches a maximum at about 45 volts and then begins the negative slope, known as the "dynatron effect." Furthermore, when the grid circuit is closed, the screen current, $I_{sc}$, acts approximately inversely of the plate current, being at a maximum at low plate voltages and dipping to a minimum at the point where the plate current is greatest, then rising slowly beyond that point as the plate voltage is increased.

It is particularly to be noted that the grid current undergoes approximately the same variations as the screen current, and the curve $I_g$ representing the grid current, when the circuit is closed, has much the same shape as curve $I_{sc}$ representing the screen current, when the grid circuit is closed. Thus, at a plate voltage of approximately 45 volts, the grid current is at a minimum and the change in screen current from open to closed grid circuit conditions is at a maximum. Furthermore, while the plate current changes from zero to about 4 milliamperes at 45 volts, the screen current changes from about 2 to 13 milliamperes representing a change in screen current at this point nearly three times as great as the corresponding change in plate current. Since the current change usually required to insure positive and consistant relay operation is of the order of 5 to 25 milliamperes it will be seen that the plate current is useless while over the entire range of operation of the circuit described the screen current could be used in practically all cases. In addition, it has been found that tubes may be operated in this manner for periods of several years without excessive degeneration despite the fact that the screen currents obtained are two to three times greater than the rated values.

In addition, the stability of screen current operation in the vicinity of this optimum point is very high. For example, with the curves of Fig. 3, it will be seen that the plate voltage may be varied from about 35 volts to approximately 65 volts and yet the change in screen current, between open and closed circuit conditions, will be in excess of 9 milliamperes throughout the entire range which is sufficient for most relay operations. Moreover, the grid current over this range is never greater than 0.0068 microamperes. Thus, for any plate voltage between 35 and 65 volts, the current amplification of the applicants' device is never less than 1,200,000 and may be as high as 2,200,000. Furthermore, this range of plate voltage is more than sufficient to accommodate normal variations in circuit components when used for relay operation and in actuating other current responsive devices.

By comparison, the maximum current amplification available at the plate is only 600,000 and it drops to half of this within a 10 volt range on either side of the optimum point. Thus, the plate current amplification is about one-third as effective as the screen current amplification and the plate current is much less stable. In addition, the change in current available at the plate, even under the best conditions, is not sufficient to do any useful work.

Furthermore, even tremendous differences in the value of the grid resistance cause only negligible changes in the minimum values obtained for the grid and screen currents. For example, in a circuit similar to that of Figs. 1 or 2, having a screen supply voltage of 243 volts, a plate supply voltage of 45 volts and with both screen load and cathode bias resistances of 10,000 ohms, the following values were obtained:

| | Open grid | Closed with 5.2 megohms | Closed with 1,200 megohms |
|---|---|---|---|
| Plate current, milliamperes | 0 | 2.2 | 1.4 |
| Screen current, milliamperes | 8.0 | 1.0 | 2.1 |
| Grid current, microamperes | -------- | .003 | .003 |
| Current amplification (grid to screen) | -------- | 2,600,000 | 2,000,000 |

Thus it will be seen that with a change of approximately 1200 megohms in the grid resistance, a change of only 1.1 milliamperes was effected in the closed circuit value of the screen current. Moreover, the change in screen current between open and closed circuit conditions is still more than adequate for operation of conventional relays and other current responsive devices. On the other hand, the plate current under both of these conditions is useless.

Figure 4:
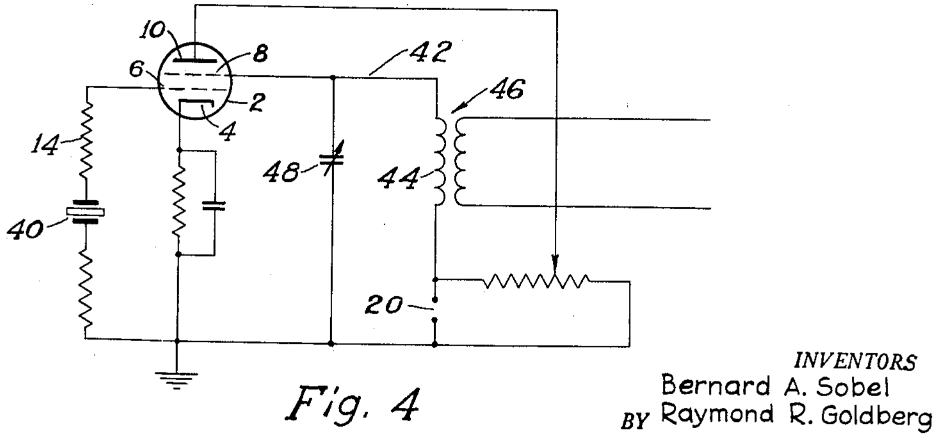
Fig. 4 illustrates a further alternative circuit arrangement embodying the present invention.

The circuit arrangement illustrated in Fig. 4 is designed particularly for use in radio frequency generators in which piezo-electric crystals, transistors or similar rectifying elements are employed. In this circuit a crystal element is indicated at 40 and the screen 8 is connected by conductor 42 to the primary 44 of a transformer 46. The conductor 42 is connected to the current source through a variable condenser 48. In a typical installation of this type the grid current through the crystal 40 may be as low as 0.1 micro-amperes and the plate 10 may be maintained at a potential in the neighborhood of 350 volts. In such a circuit the transformer 46 may have an output of 5 watts or more. These low crystal currents greatly increase the frequency stability and life of the crystal.

In each of the circuits illustrated, it will be apparent that the current amplification is increased tremendously with the result that it is possible to eliminate one or more stages of direct current amplification. A single tube circuit may be used and yet the sensitivity of control of indicating devices may be greatly increased. The invention is further applicable to high input impedance amplifiers for radio and audio frequencies and the circuits may be used in many other applications and systems.

While typical circuits in which screen grid tubes are employed have been illustrated in the drawings, it will be apparent that the circuits chosen for purposes of illustration are diagrammatic and have been presented in their most simplified forms. The application of the present invention and the principle of operating the screen at a higher potential than the plate while taking the output current from the screen is of general application and is by no means limited to the particular circuit arrangements shown in the drawings. It will also be obvious that the manner in which screen output current is used will in no way alter the operation of the circuit so that relays or any other type of current responsive means or circuits may be energized or controlled in accordance with the present invention. In view thereof, it should be understood that the particular embodiments of the invention and the uses thereof in the circuits shown in the drawings and described above are intended to be illustrative only and are not intended to limit the scope of the invention.

We claim:

1. An electronic amplifying circuit including a multigrid electronic tube having a cathode, a grid, a screen and a plate, a cathode biasing resistance connecting said cathode to ground, an input circuit for supplying current to said grid, means for opening and closing said input circuit, means for maintaining said plate at a potential less than the IR drop through said cathode biasing resistance when the grid input circuit is open and greater than the IR drop through said cathode biasing resistance when the grid input circuit is closed, means for establishing a screen potential higher than that of said plate, and means for utilizing the current from said screen.

2. An electronic amplifying circuit including a multigrid amplifier tube having a cathode, a grid, a screen and a plate, a cathode biasing resistance connecting said cathode to ground, an input circuit for supplying current to said grid, means for opening and closing said input circuit, means for maintaining said plate at a potential less than the IR drop through said cathode biasing resistance when the grid input circuit is open and greater than the IR drop through said cathode biasing resistance when the grid input circuit is closed, means for maintaining said screen at a potential higher than that of said plate, and current responsive means connected to receive current from said screen.

3. An electronic amplifying circuit including a multigrid amplifier tube having a cathode, a grid, a screen and a plate, a cathode biasing resistance connecting said cathode to ground, an input circuit for supplying current to said grid including means for varying the current in said input circuit between upper and lower limits, means for maintaining said plate at a potential less than the IR drop through said cathode biasing resistance when the current in the grid input circuit is at said lower limit and greater than the IR drop through said cathode biasing resistance when the current in the grid input circuit is at said upper limit, means for maintaining said screen at a potential higher than that of said plate, and current responsive means connected to receive current from said screen and responsive to changes in the current supplied to said grid.

4. An electronic amplifying circuit including a multigrid amplifier tube having a cathode, a grid, a screen and a plate, a cathode biasing resistance connecting said cathode to ground, an input circuit for supplying current to said grid including means for opening and closing said input, means for maintaining said plate at a potential less than the IR drop through said cathode biasing resistance when the grid circuit is open and greater than the IR drop through said cathode biasing resistance when the grid circuit is closed, means for maintaining said screen at a potential higher than that of said plate, and means actuated by current from said screen and responsive to opening and closing of said input circuit.

5. An electronic amplifying circuit including a multigrid amplifier tube having a cathode, a grid, a screen and a plate, a cathode biasing resistance connecting said cathode to ground, an input circuit for supplying current to said grid, means for opening and closing said input circuit, means for maintaining said plate at a potential less than the IR drop through said cathode biasing resistance when the grid input circuit is open and greater than the IR drop through said cathode biasing resistance when the grid input circuit is closed, means for maintaining said screen at a potential higher than that of said plate and means for utilizing the current from said screen, the effective current amplification of said electronic circuit being in excess of one million.

6. An electronic circuit for direct current amplification, said circuit including a multigrid amplifier tube having a cathode, a grid, a screen and a plate and having substantially the same characteristics as those of the tube now known as 117/L7/M7, a direct current input circuit connected to said grid, a cathode biasing resistance connecting said cathode to ground, means for opening and closing said input circuit, means for maintaining said plate at a potential of less than 80 volts, means for maintaining said screen at a potential at least 50 volts higher than that of said plate, and means for utilizing the direct current from said screen responsive to opening and closing of said input circuit.

7. An electronic circuit for direct current amplification, said circuit including a multigrid amplifier tube having a cathode, a grid, a screen and a plate and having substantially the same characteristics as those of the tube now known as 117/L7/M7, a direct current input circuit connected to said grid, a cathode biasing resistance connecting said cathode to ground, means for opening and closing said input circuit, means for maintaining said plate at a potential of less than 80 volts, means for maintaining said screen at a potential at least 50 volts higher than that of said plate, and a relay connected to said screen and responsive to changes in the screen current upon opening and closing of said input circuit.

8. An electronic circuit for direct current amplification, said circuit including a multigrid amplifier tube having a cathode, a grid, a screen and a plate and having substantially the same characteristics as those of the tube now known as 117/L7/M7, a direct current input circuit supplying current to said grid and including means for varying the current in said input circuit, a cathode biasing resistance connecting said cathode to ground, means for maintaining said plate at a potential of less than 80 volts, means for maintaining said screen at a potential at least 50 volts higher than that of said plate, and means receiving direct current from said screen and responsive to variations in the current of said input circuit.

9. An electronic circuit including a beam power amplifier tube having a cathode, a grid, a screen and a plate and having substantially the same characteristics as those of the tube now known as 117/L7/M7, a cathode biasing resistance connecting said cathode to ground, means for maintaining said plate at a potential of between 35 and 65 volts, means for maintaining said screen at a potential at least 50 volts higher than that of said plate, and means for utilizing the current from said screen, the current amplification of said circuit being in excess of one million.

10. An electronic circuit including a multigrid amplifier tube having a cathode, a grid, a screen and a plate, a cathode biasing resistance connecting said cathode to ground, an input circuit connected to said grid, means for opening and closing said input circuit, means for maintaining said plate at a potential less than the IR drop through said cathode biasing resistance when said input circuit is closed and greater than the IR drop through said cathode biasing resistance when said input circuit is open, and means for maintaining said screen at a potential higher than that of said plate, said circuit having characteristics such that the screen current and grid current become minimized at the same value of plate potential.

11. An electronic amplifying circuit including a multigrid amplifier tube having a cathode, a grid, a screen and a plate, a cathode biasing resistance connecting said cathode to ground, an input circuit connected to said grid, means for varying the current in said input circuit between upper and lower limits, means for maintaining said plate at a potential less than the IR drop through said cathode biasing resistance when the current is said input circuit is at said lower limit and greater than the IR drop through said cathode biasing resistance when the current in said input circuit is at said upper limit, means for maintaining said screen at a potential higher than said plate, and an output circuit including current responsive means connected to receive current from said screen.

References Cited in the file of this patent

UNITED STATES PATENTS

| | | |
|---|---|---|
| 1,760,520 | Payne | May 27, 1930 |
| 2,226,561 | Herold | Dec. 31, 1940 |
| 2,226,752 | Eaglesfield | Dec. 31, 1940 |
| 2,275,016 | Koch | Mar. 3, 1942 |
| 2,276,417 | Preisach | Mar. 17, 1942 |
| 2,403,615 | Sanders | July 9, 1946 |

OTHER REFERENCES

Article entitled: "Negative Resistance and Devices for Obtaining It," by Herold, Proc. of I.R.E., vol. 23, No. 10, October 1935, pp. 1201–1223.

Reich text: "Theory and Applications of Electron Tubes," 1st ed., pp. 184–185, pub. 1939 by McGraw-Hill Book Co. (Copy in Div. 69.)

Terman text: "Radio Engineering," 3d ed., pp. 174–176, pub. 1947 by McGraw-Hill Book Co. (Copy in Div. 48.)